United States Patent [19]

Stoilov

[11] 3,962,777
[45] June 15, 1976

[54] TOOL CLAMPING DEVICE FOR MULTIPLE-OPERATION MACHINES

[75] Inventor: Nikola Dimov Stoilov, Sofia, Bulgaria

[73] Assignee: Institute za Metalloobraborvashti Machini, Sofia, Bulgaria

[22] Filed: Dec. 19, 1974

[21] Appl. No.: 534,439

[30] Foreign Application Priority Data
Dec. 19, 1973 Bulgaria................................ 25288

[52] U.S. Cl................................. 29/568; 29/26 A; 279/1 TS
[51] Int. Cl.[2].................. B23Q 1/155; B23B 39/00; B23B 31/06
[58] Field of Search................ 29/26 A, 568; 279/4, 279/1 TS

[56] References Cited
UNITED STATES PATENTS

| | | |
|---|---|---|
| 3,263,300 | 8/1966 | Schatzman et al.................. 29/26 A |
| 3,526,033 | 9/1970 | Saunders............................... 29/568 |
| 3,587,164 | 6/1971 | Davern ................................. 29/568 |
| 3,590,470 | 7/1971 | Brainard ............................. 29/26 A |
| 3,840,981 | 10/1974 | Kielma.................................. 29/568 |

Primary Examiner—Harrison L. Hinson

[57] ABSTRACT

A tool clamping device for multiple-operation machines or machining centers. The device has a self-blocking fork for selectively securing a tool on a tool changing device or autooperator, the fork being in the shape of jaws which partially embrace the shank of a tool. In both arms of the fork there are profile grooves in which there are located pivotally mounted blocking pins. Between the blocking pins and the bottom wall of the grooves there are springs for constantly pressing the blocking pins toward their blocking position. The blocking pins are L-shaped, and in their blocking position the end of one arm of each protrudes outwardly in position to be engaged by the face keys of the spindle of the machine in the operation of removing a tool from the spindle of the machine.

3 Claims, 10 Drawing Figures

TOOL CLAMPING DEVICE FOR MULTIPLE-OPERATION MACHINES

This invention relates to a device for clamping a tool on a tool changing device for multiple-operation machines or machining centers operating with rotating tools.

There are known tool changing devices with jaws for clamping the tools in which the opening and the closing of the jaws is effected by a hydraulic or a pneumatic cylinder. A drawback of these devices is the complexity of their design and the necessity of a cylinder, hoses (or pipes), distributors and switches.

Also known are devices for tool clamping on tool changing devices in which the clamping force is produced by a spring which continuously presses two movable jaws. These devices are of simple design, but they have a number of drawbacks. The clamping and removal of the tools require considerable force, and it is accompanied by blows, wearing of the jaws, small clamping forces, etc. For these reasons, such devices are used only for small and light tools.

Also known are tool clamping devices on tool changing devices in which the afore-mentioned drawbacks are avoided to a large degree. They do not comprise any hydraulic or pneumatic systems, the process of tool clamping requires small forces, and during its transfer the tool cannot fall off the tool transferring device or autooperator. These are the so-called self-blocking clamps. However, the design of these devices is complex and they inevitably require the presence of a cam near the spindle of the machine. This cam serves as a means for deblocking the tool clamping device.

It is therefore a general object of the present invention to avoid the afore-mentioned drawbacks by providing a self-blocking tool clamping device for tool changing devices which is of simple design and does not require the presence of cams around the spindle of the machine for deblocking the tool clamping device.

This object is achieved by a device according to the invention comprising a self-blocking fork, in both arms of which there are profile grooves. Located in the latter are blocking pins mounted on pivot pins supported in holes in the fork. Between the bottom walls of the grooves and the blocking pins there are springs for continuously pressing the blocking pins toward their blocking position.

The advantages of the device of the invention are that the grooves already existing on the tools which are intended for the face keys of the spindle are used for blocking the pins, and thus it is not necessary to provide additional grooves. No additional mechanism is required for deblocking the tool, since the face keys of the spindle are used for this purpose. The design of the device is simple and it is easy to produce.

For a better understanding of the invention, reference should be made to the accompanying drawings in which there are illustrated preferred embodiments of the invention. In the drawings:

FIG. 2a is a diagrammatic illustration in elevation of the blocking pin of FIG. 1 showing an interlocking force acting thereon;

Figure 1:
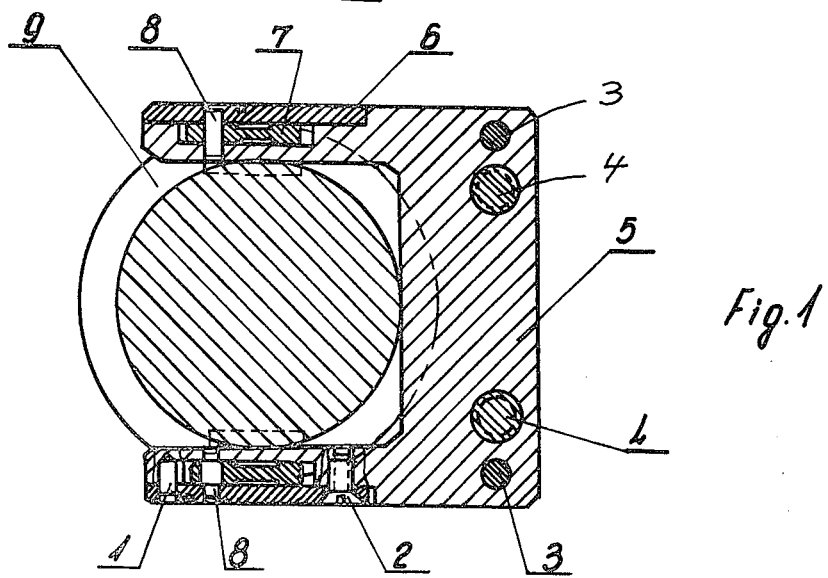
FIG. 1 is a sectional view of a first illustrative embodiment of the device with a clamped tool, the section being taken perpendicularly to the axis of the tool.
Figure 2:
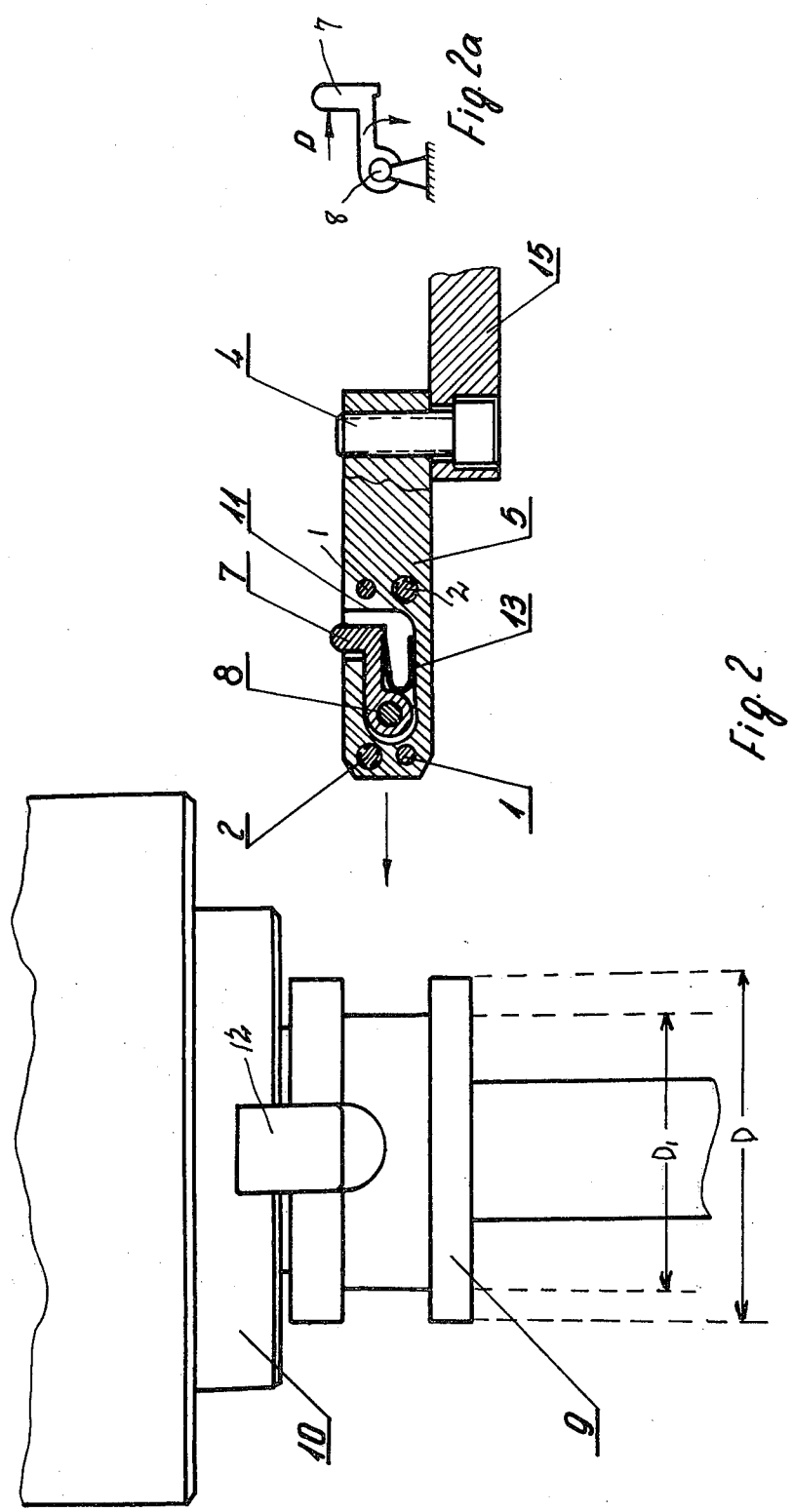
FIG. 2 is a vertical sectional view of the device shown in FIG. 1, the device being shown with a portion of a multi-operation machine.

Turning first to the embodiment of FIGS. 1 to 5, inclusive, the tool clamping device for multiple-operation machines or machining centers comprises a fork 5, into the confronting faces of the opposite arms of which two L-shaped grooves 11 are milled. Located within such grooves are respective blocking pins 7, also of L-shape, which are pivotally mounted upon respective pivot pins 8 which are pressed into holes in their respective arm of the fork. The pivot pins 8 can also be of stepped shape, as shown in FIG. 1, and in this case there can be a loose fit between the pivot pin 8 and the blocking pin or lever 7. The blocking pins 7 are each constantly pressed upwardly by flat springs 13 toward a position in which the upper free end of the vertical arm of the blocking pin protrudes outwardly as shown in FIG. 2. Cover plate 6 over the respective blocking pins 7 and the flat spring 13 are fastened to the respective arm of the fork 5 by means of screws 2 and pins 1. The fork 5 is fastened to the end of the tool changer or autooperator 15 by means of bolts 4 and pins 3.

Figure 3:
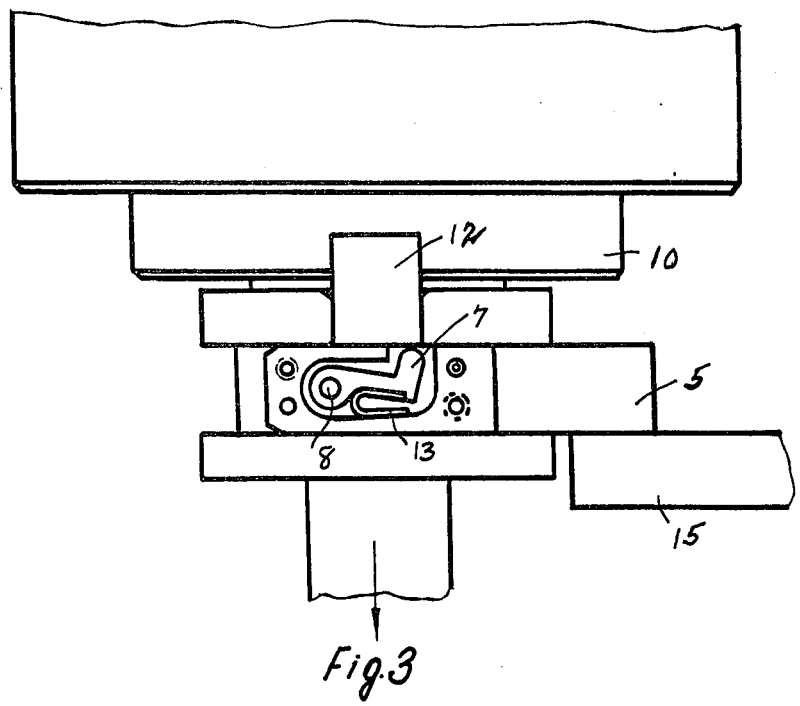
FIGS. 3, 4 and 5 show diagrammatically the process of clamping and blocking the tool by the device of FIGS. 1, 2, and 2a, with the side plate of the device removed for clarity of illustration.
Figure 4:
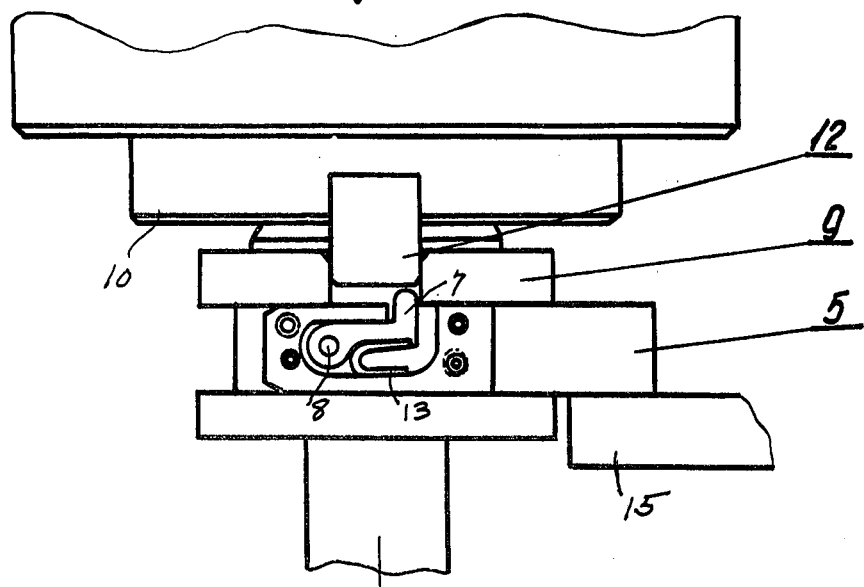
Figures 5, 5A:
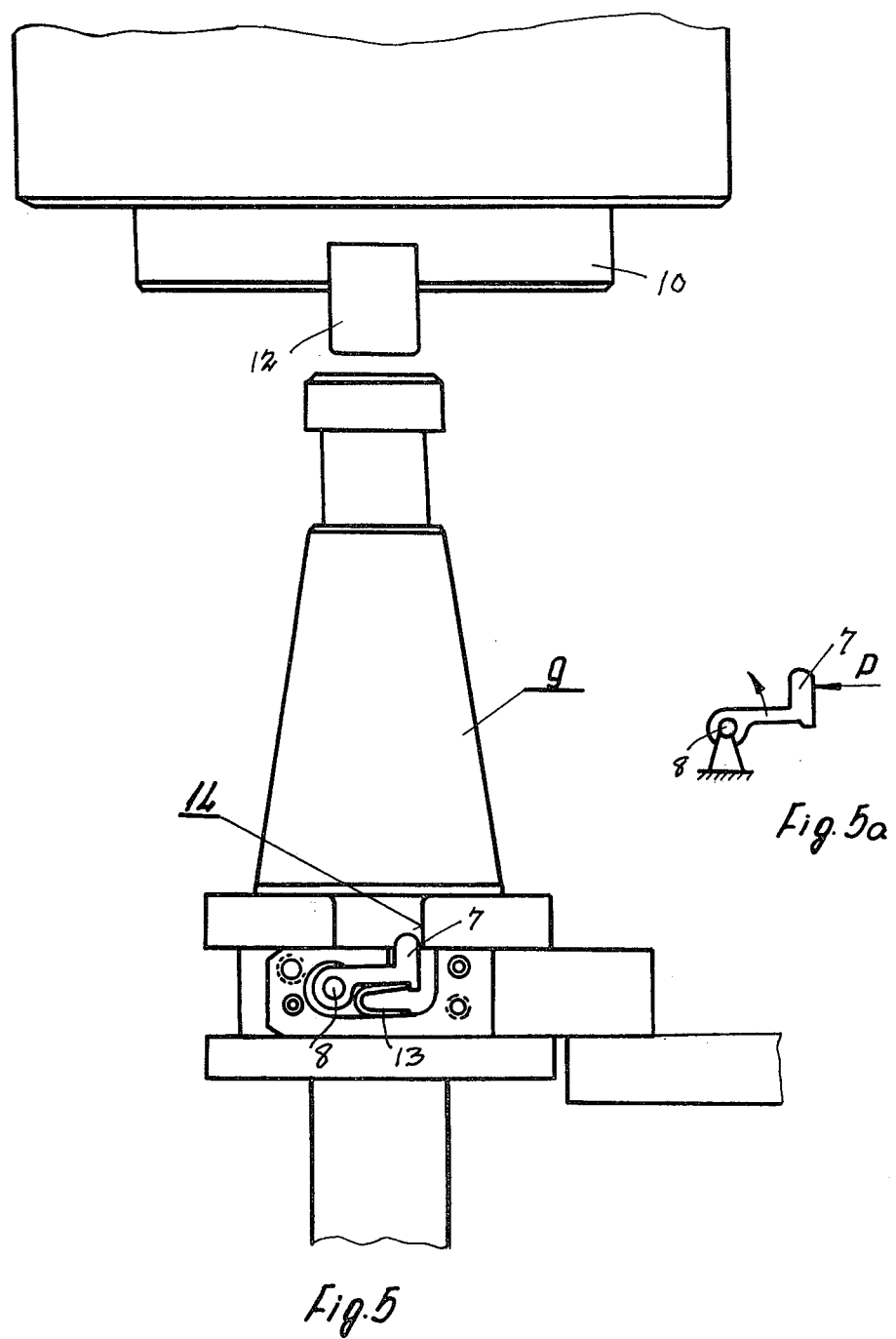
FIG. 5a is a diagrammatic illustration in elevation of the blocking pin of FIG. 5 showing a blocking force acting thereon.

The device illustrated in FIGS. 1 to 5a, inclusive, operates as follows:

For clamping a tool 9, the tool changer or autooperator 15 performs a transverse motion toward the spindle 10 of the machine (FIG. 2). After the device has attained the position of the tool 9 (FIG. 3), the blocking pins or lever 7 rotate clockwise (FIG. 2a) and are pressed downwardly by the face keys 12 on the tool spindle so that the member 7 lies totally within the grooves 11 in the fork, thus compressing the springs 13. Then the autooperator 15 starts a reverse motion for pulling the tool 9 from the spindle 10. The fork 5 is removed a distance from the face keys 12, thus making it possible for the blocking pins 7 to resume the position shown in FIG. 2 under the action of springs 13. The blocking pins 7 resume their terminal position (FIG. 2) before the face keys have emerged from the grooves 14 in the upper flange on the shank of the tool 9. The fork fits accurately within the upper and lower flanges on the shank of the tool 9, as shown in FIGS. 3, 4 and 5, so that the tool is effectively locked or blocked in the fork 5 and cannot escape from it, since all the inertia forces which act in the direction of pulling out of the tool 9 from the fork 5 produce a torque (FIG. 2a) which stabilizes still more the position of the blocking pins 7.

The insertion of tool 9 into spindle 10 is carried out in the sequence which is opposite from that described above. When inserting the tool 9 into the spindle 10, the face keys 12 press the blocking pins 7 and they are drawn into the grooves of fork 5. The transverse motion of the autooperator 15 causes the fork 5 to be removed from the tool 9.

Figure 6:
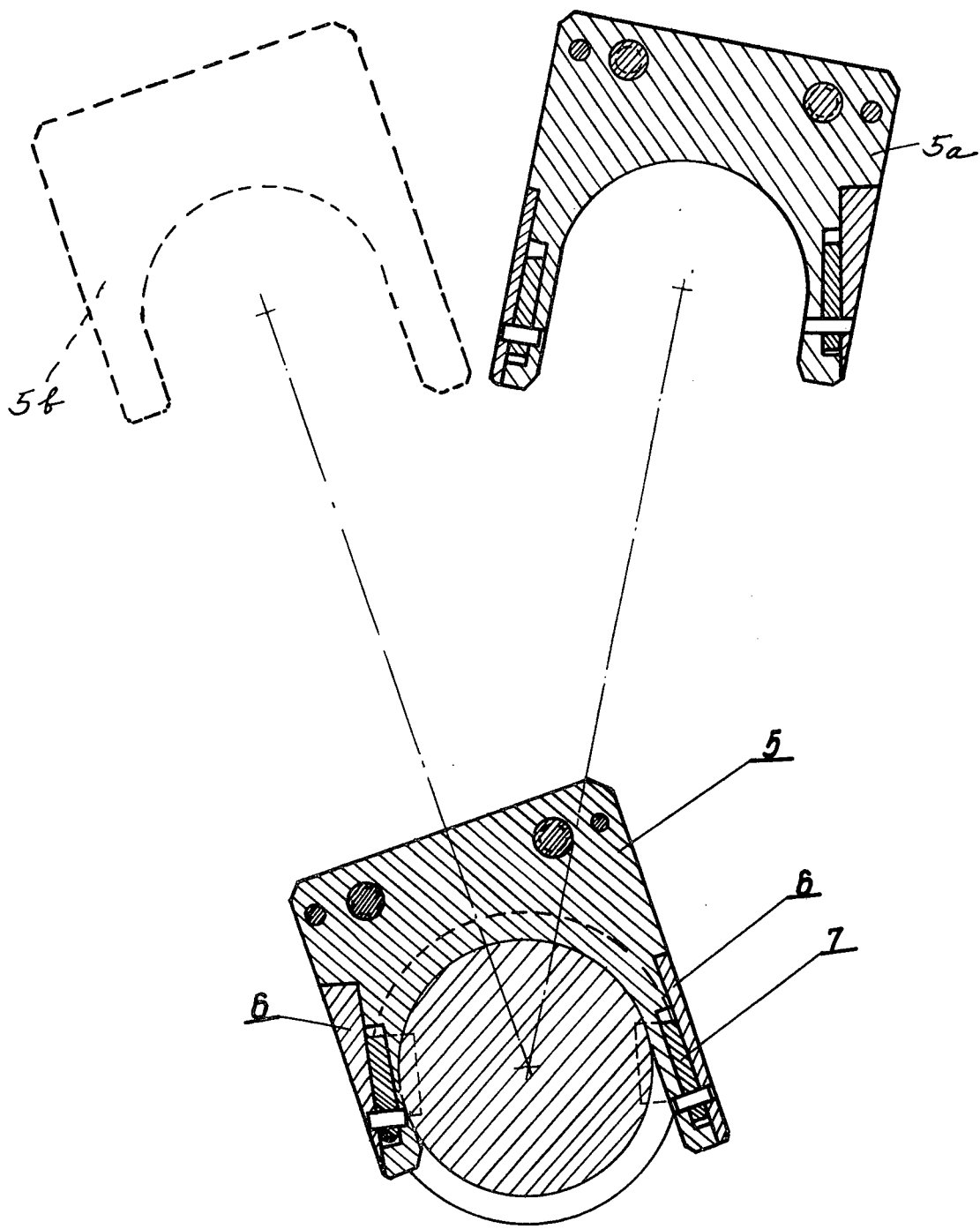
FIG. 6 is a fragmentary view in horizontal section of a second embodiment of a tool clamping device for an autooperator, such device being provided with two intersecting mechanical hands.

A second embodiment of the tool clamping device of the invention is shown in FIG. 6. In such figure two intersecting mechanical hands, 5a and 5b are employed, such hands selectively engaging a tool 9 so as either to introduce it into the spindle of a multiple-operation machine or machining center or to remove it therefrom. In his case the opposite arms of the fork are asymmetrical, as shown.

Figure 7:
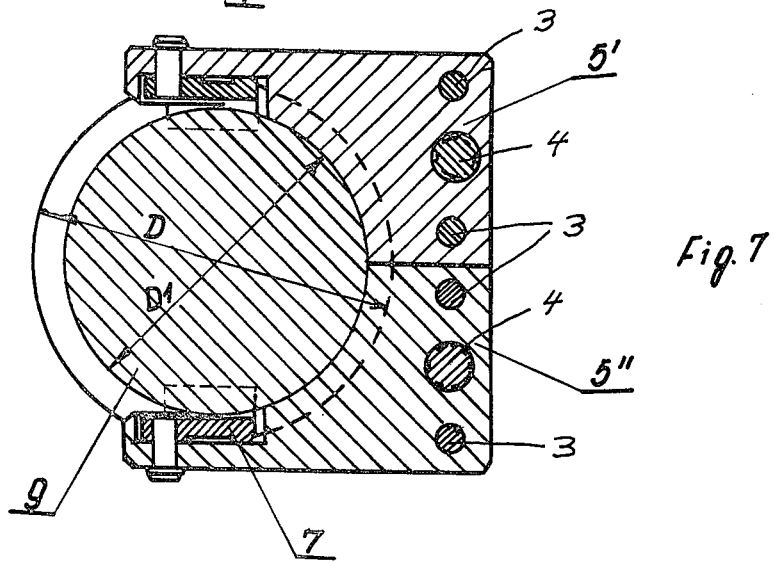
FIG. 7 is a horizontal sectional view of a third embodiment of the device with a clamped tool.

Another preferred embodiment of the device is shown in FIG. 7, wherein the fork is composed of two parts 5' and 5'', the arms of the composited fork being constructed in generally the same manner as in the first embodiment of FIGS. 1 to 5, and 5a. As before, blocking pins 7 are pivotally mounted in grooves in the confronting faces of the opposite arms of the fork. The construction of FIG. 7 is advantageous when the difference between the diameter D of the axially spaced flanges on the tool shank and the diameter $D_1$ of the portion of the shank between such flanges is small.

Figure 8:
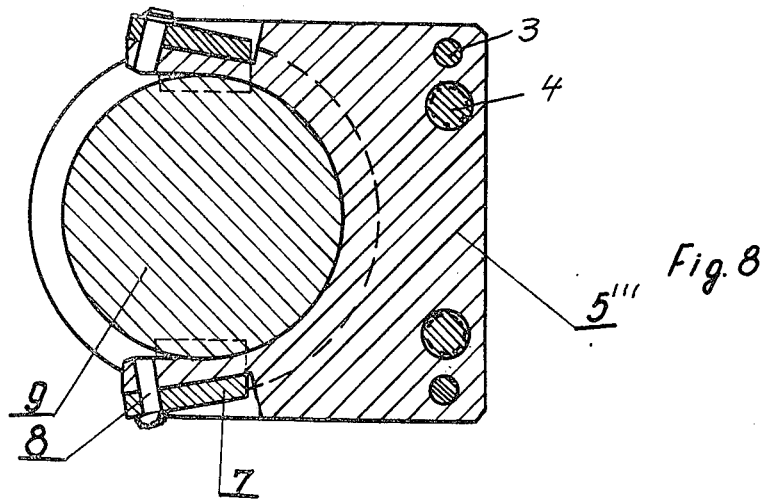
FIG. 8 is a horizontal sectional view of a fourth embodiment of the device with a clamped tool.

In FIG. 8 there is shown a still further embodiment of the tool clamping device for multiple-operation machines or machining centers of the invention. Such device is essentially similar to that of FIGS. 1 to 5, and 5a with the exception that the arms of the fork 5''' extend at an angle with respect to each other rather than being parallel as in the other embodiments. Inclined grooves are milled in the opposite arms of the fork 5'''. Located in such grooves are blocking pins 7 which are pivotally mounted upon pivot pins 8.

The tool clamping device of the present invention is intended for multiple-operation machines or machining centers, in which during the change of the tools the spindle remains fixed so that the face keys extend perpendicularly to the motion of the tool changer or autooperator.

Although the invention is illustrated and described with reference to a plurality of preferred embodiments thereof, it is to be expressly understood that it is in no way limited to the disclosure of such a plurality of preferred embodiments, but is capable of numerous modifications within the scope of the appended claims.

What is claimed is:

1. In the combination of a multiple-operation machine having a spindle with a pair of face keys and a tool changer therefor, an improved tool clamping device, comprising a self-blocking fork having a pair of arms adapted partially to embrace the shanks of a tool, wherein in both arms of the fork there being profile grooves, blocking pins pivotally mounted in respective ones of the grooves and springs between the blocking pins and the bottom wall of the grooves for continually pressing the blocking pins toward their tool blocking positions, the blocking pins having portions which are so disposed as to be engageable by the face keys on the spindle of the multiple-operation machine upon the approach of a spindle to the tool-changing position of the tool clamping device, thereby to thrust the blocking pins to the tool unblocking position.

2. The tool clamping device according to claim 1, wherein the blocking pins are L-shaped, a first arm of each of the pins extending generally parallel to the machine spindle when the tool clamping device is disposed in the tool changing position, the outer free end of the first arm of each blocking pin protruding outwardly of the device so as to be engageable by a respective face key on the machine spindle.

3. The tool clamping device according to claim 2, wherein the blocking pins are L-shaped and are pivotally mounted adjacent the outer end of the second arm thereof.

* * * * *